(12) United States Patent
Furlan

(10) Patent No.: US 8,555,670 B2
(45) Date of Patent: Oct. 15, 2013

(54) POWER CONSUMPTION ECONOMIZER FOR REFRIGERATING MACHINES OF THE CHILLER TYPE

(75) Inventor: Giancarlo Furlan, Padova (IT)

(73) Assignee: Emerson Network Power S.R.L., Piove di Sacco (IT)

( * ) Notice: Subject to any disclaimer, the term of this patent is extended or adjusted under 35 U.S.C. 154(b) by 285 days.

(21) Appl. No.: 13/067,874

(22) Filed: Jul. 1, 2011

(65) Prior Publication Data
US 2012/0000241 A1 Jan. 5, 2012

(30) Foreign Application Priority Data
Jul. 5, 2010 (IT) ................. PD2010A0208

(51) Int. Cl.
*F25B 23/00* (2006.01)

(52) U.S. Cl.
USPC ............................... 62/467; 62/513

(58) Field of Classification Search
USPC ............... 62/467, 498, 513, 197, 200, DIG. 2
See application file for complete search history.

(56) References Cited

U.S. PATENT DOCUMENTS

| 4,232,529 A * | 11/1980 | Babbitt et al. ............... 62/160 |
| 5,611,846 A * | 3/1997 | Overton et al. ............... 96/102 |
| 7,320,459 B2 * | 1/2008 | Johns ............................ 261/142 |
| 8,418,487 B2 * | 4/2013 | King ............................. 62/185 |

FOREIGN PATENT DOCUMENTS

| EP | 0675331 A2 | 10/1995 |
| EP | 1403608 A1 | 3/2004 |
| WO | WO2008/142661 A2 | 11/2008 |

* cited by examiner

*Primary Examiner* — Mohammad M Ali
(74) *Attorney, Agent, or Firm* — Modiano & Associati; Daniel O'Byrne; Albert Josif

(57) ABSTRACT

A power consumption economizer for refrigerating machines of the chiller type, comprising, on a same line, a pump for a heat transfer fluid, an evaporator of an associated refrigeration system for refrigerating the heat transfer fluid, sensors for detecting the flow and temperature of the heat transfer fluid and flow-rate adjustment means being associated with the pumping means. The system comprises bypass elements adapted to exclude reversibly the evaporator from the line.

5 Claims, 1 Drawing Sheet

POWER CONSUMPTION ECONOMIZER FOR REFRIGERATING MACHINES OF THE CHILLER TYPE

BACKGROUND OF THE INVENTION

The present invention relates to a power consumption economizer for refrigerating machines of the chiller type.

Currently, in order to cool an enclosed space by means of conditioning units using refrigerated water (fan coils), these conditioning units are fed with heat transfer fluid, typically water or water with the addition of glycol, which circulates from refrigerating machines of the so-called "chiller" type.

The hydraulic systems for such refrigerating machines are provided, on a same line, with pumping means adapted to propel a heat transfer fluid through a refrigeration exchanger of the heat transfer fluid, which merely consists in the evaporator of an associated refrigeration system for cooling the water.

A similar type of system is also provided with a free cooling device, known as "free cooling" in the jargon, for the heat transfer fluid.

Sensors for detecting the flow and temperature of the heat transfer fluid are associated with the pumping means, so that the inverter pump can modify its own operation to keep the flow-rate constant depending on the variations of the contrasting hydraulic load (i.e., variations in the contrasting pressure).

Although these refrigeration systems of the chiller type are widespread and appreciated, they have aspects that can be improved from the point of view of energy consumption.

The water flow is in fact propelled through the so-called evaporator, i.e., the heat exchange device for cooling the same water that then circulates in the conditioning units, even when the compressors of the evaporator are off because the water does not need to be cooled, i.e., when the cooling demand is nil, both if the thermal load is nil and if the thermal load is met by the refrigeration capacity of the free cooling exchanger.

This entails a significant expenditure of energy used by the pump to propel the water so as to overcome the load losses imposed by the flow of the water inside the evaporator.

SUMMARY OF THE INVENTION

The aim of the present invention is to provide a power consumption economizer for refrigerating machines of the chiller type that allows an important saving in terms of energy consumption with respect to known systems.

Within this aim, an object of the invention is to provide an economizer that can be manufactured easily also in association with chillers of the known type and already in use.

Another object of the invention is to provide a device that can also be installed on chillers provided with a free cooling system.

Another object of the invention is to propose a power consumption economizer for refrigerating machines of the chiller type that can be manufactured with known systems and technologies and which can be produced at costs which are competitive compared to conventional systems for chillers.

This aim and these objects, as well as others that will become better apparent hereinafter, are achieved by a power consumption economizer for refrigerating machines of the chiller type, comprising, on a same line, pumping means for a heat transfer fluid, an evaporator of an associated refrigeration system for refrigerating the heat transfer fluid, sensors for detecting the flow and temperature of the heat transfer fluid and flow-rate adjustment means being associated with said pumping means, said device being characterized in that it comprises bypass means adapted to exclude reversibly said evaporator from the line, said pumping means comprising an inverter pump.

BRIEF DESCRIPTION OF THE DRAWINGS

Further characteristics and advantages of the invention will become better apparent from the description of two preferred but not exclusive embodiments of the hydraulic system for refrigerating machines of the chiller type according to the invention, illustrated by way of nonlimiting example in the accompanying drawings, wherein.

DESCRIPTION OF THE PREFERRED EMBODIMENTS

Figure 1:
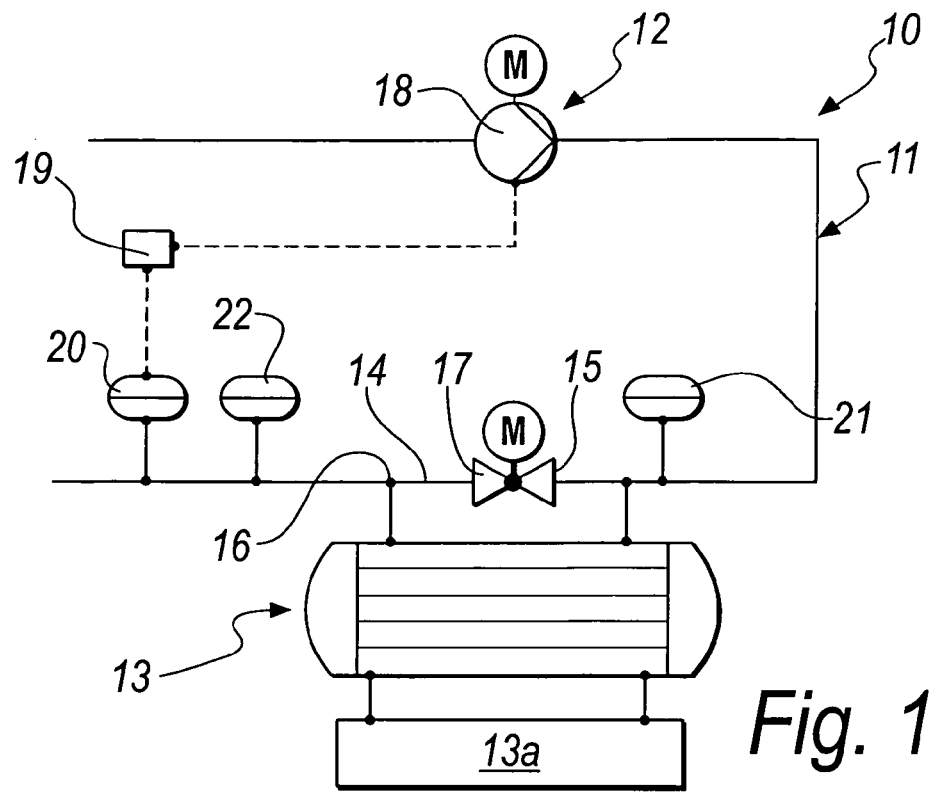
FIG. 1 is a system diagram of the economizer according to the invention in a first embodiment thereof.

With reference to the figures, a power consumption economizer for refrigerating machines of the chiller type is generally designated by the reference numeral 10 in its first embodiment.

The device 10 comprises, on a same line 11, pumping means 12 for a heat transfer fluid and an evaporator 13 of an associated refrigeration system 13a for refrigerating the heat transfer fluid.

Sensors for detecting the flow and temperature of the heat transfer fluid and flow-rate adjustment means, described in greater detail hereinafter, are associated with the pumping means 12.

The peculiarity of the power consumption economizer 10 consists in that it comprises bypass means adapted to exclude reversibly the evaporator 13 from the line if the demand to cool the heat transfer fluid is nil, as is the case when the thermal load is nil, and in that the pumping means 12 comprise an inverter pump 18.

The bypass means are constituted by a duct 14 which is interposed between the inlet 15 and the outlet 16 of the evaporator 13, a motorized two-way valve 17 being arranged on the duct 14.

As mentioned, the pumping means comprise an inverter pump 18 whose operation is controlled by the flow-rate adjustment means, which in this embodiment are constituted by an autonomous electronic controller 19.

The flow sensors, in the embodiment of the invention described herein, are constituted by a flow transducer 20 which is arranged in output to the evaporator 13.

The temperature sensors are constituted by a first sensor 21, which is arranged so as to measure the temperature of the water in input to the evaporator 13, and a second sensor 22, which is arranged so as to measure the temperature of the water at the output from the evaporator 13.

The electronic controller 19 manages and processes the data that arrive from the temperature sensors and from the flow transducer, and on the basis of these data it acts on the rotation rate of the inverter pump 18.

The electronic controller 19 works so as to keep the water flow-rate constant as the contrasting hydraulic load varies, and is designed to control the opening and closing of the motorized two-way valve 17.

The power consumption economizer 10 according to the invention works as follows.

If the demand for cooling of the enclosed space to which the chiller is related is nil, the compressor or compressors of the refrigeration system 13a switch off.

When the compressor or compressors are off, the electronic controller 19, which supervises the opening and closing of the motorized two-way valve 17, acts to open the two-way valve 17 so that the flow of water passes mainly through the duct 14, which defines a passage with lower load losses than transit through the evaporator 13, and the electric motor of the inverter pump 12 operates with great power saving, since it works at a lower rate to maintain the same water flow-rate and by handling a lower pressure.

Figure 2:
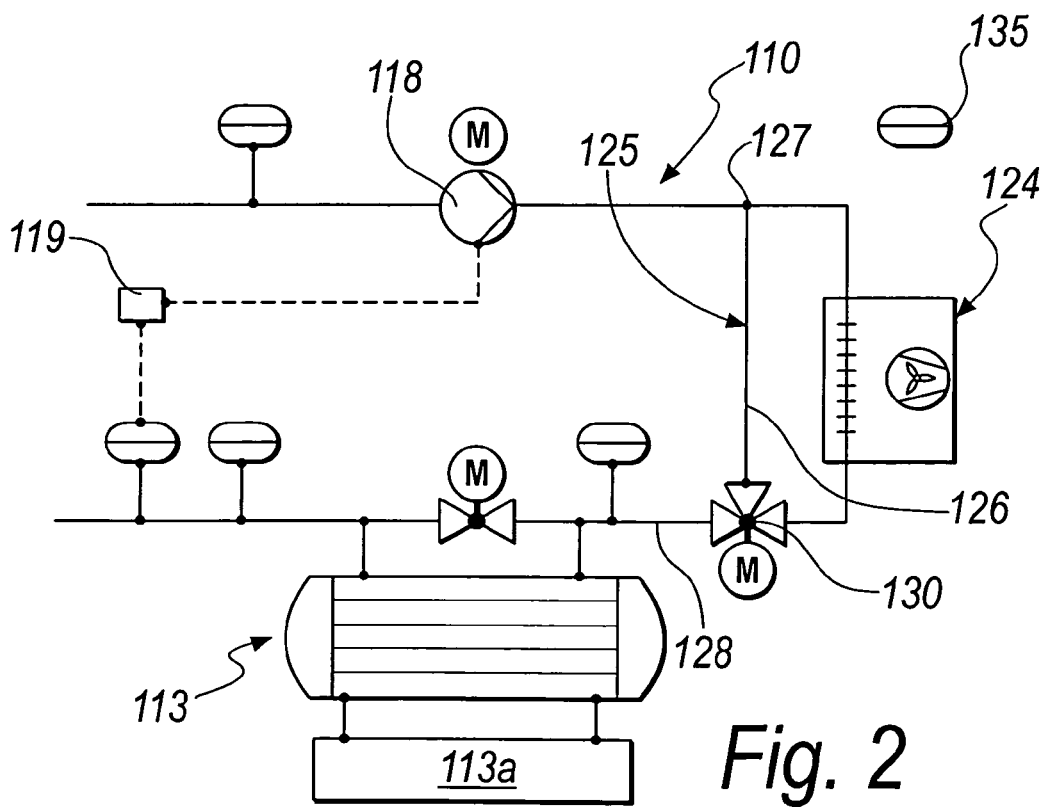
FIG. 2 is a system diagram of the economizer according to the invention in a second embodiment thereof.

In a second embodiment, designated by the reference numeral 110 in FIG. 2, the economizer 110 comprises, in addition to the inverter pump 118 and the evaporator 113, also a free cooling device 124.

The economizer 110 comprises second bypass means 125, which are adapted to exclude reversibly the free cooling device 124 if its operation is not required.

The second bypass means 125 for the free cooling device 124 are constituted by a duct 126 which is interposed between the inlet 127 and the outlet 128 of the free cooling device 124, a motorized three-way valve 130 being arranged on the outlet.

The evaporator 13, like the refrigeration system 13a and the free cooling device 124, are to be understood as being of a per se known type.

The economizer 110 for chillers with free cooling device 124 operates like the device 10 according to the first embodiment disclosed above, with the addition of the fact that the electronic controller 119 also supervises the opening and closing of the three-way valve 130, receiving information about the external temperature of the air from an external temperature sensor 135.

The economizer 110 makes it possible to save operating power of the pump 118 not only by bypassing the evaporator 113, a situation which is highly relevant especially in winter, when the compressors of the system 113a are normally off, but also by bypassing the free cooling device 124, which remains extensively unused in the summer period.

In practice it has been found that the invention achieves the intended aim and objects.

In particular, the invention provides a power consumption economizer for refrigerating machines of the chiller type that allows an important saving in terms of energy consumption with respect to conventional systems.

Furthermore, the invention has perfected a device that can be provided easily even in association with chillers of the known type and already in use.

Furthermore, the invention provides a system that can also be used on chillers provided with a free cooling device.

Not least, the invention has perfected a power consumption economizer for refrigerating machines of the chiller type that can be provided by means of known systems and technologies and that can be manufactured at costs which are competitive compared to systems for chillers of the known type.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. PD2010A000208 from which this application claims priority are incorporated herein by reference.

What is claimed is:

1. A power consumption economizer for refrigerating machines of the chiller type, comprising, on a same line, pumping means for a heat transfer fluid, an evaporator of an associated refrigeration system for refrigerating the heat transfer fluid, sensors for detecting the flow and temperature of the heat transfer fluid and flow-rate adjustment means being associated with said pumping means, further comprising bypass means adapted to exclude reversibly said evaporator from the line, said pumping means comprising an inverter pump.

2. The economizer according to claim 1, further comprising a free cooling device for said heat transfer fluid and second bypass means adapted to exclude reversibly said free cooling device if its operation is not required.

3. The economizer according to claim 1, wherein said pumping means are provided with an inverter pump whose operation is controlled by an autonomous electronic controller, which is interconnected with said flow and temperature sensors.

4. The economizer according to claim 1, wherein said bypass means are constituted by a duct which is interposed between an inlet and an outlet of said evaporator, a motorized two-way valve being arranged on said duct.

5. The economizer according to claim 2, wherein said second bypass means for said free cooling device are constituted by a duct which is interposed between an inlet and an outlet of said free cooling device, a motorized three-way valve being arranged on said outlet.

* * * * *